United States Patent Office 3,706,685
Patented Dec. 19, 1972

3,706,685
CROSS-LINKABLE POLYMER COMPOSITIONS COMPRISING ETHYLENICALLY UNSATURATED POLYMER
Karl Brack, Wilmington, Del., assignor to Hercules Incorporated, Wilmington, Del.
No Drawing. Filed July 1, 1971, Ser. No. 159,044
Int. Cl. C08f 11/00, 11/02
U.S. Cl. 260—22 R
9 Claims

ABSTRACT OF THE DISCLOSURE

Cross-linkable polymer compositions are described which comprise an ethylenically unsaturated polymer, the sultone adduct of a tertiary amine and a precursor of a polyfunctional nitrile N-oxide or nitrile imine. Typical sultone adducts are the 1,3-propane sultone adducts of triethylamine, triethylenediamine, N-methyl morpholine and quinuclidine. These compositions, which cross-link on heating, are useful as sealants and adhesives and in coating compositions.

---

This invention relates to cross-linkable polymer compositions useful in sealants, adhesives, coatings, molding, casting, etc., and to a process of cross-linking said compositions. More particularly, this invention relates to cross-linkable ethylenically unsaturated polymer compositions which cross-link on initiation with heat.

It is known that ethylenically unsaturated polymers can be cross-linked by means of 1,3-dipolar compounds such as polyfunctional nitrile N-oxides or nitrile imines. To utilize such a cross-linking process in, for example, a sealant composition, a precursor of the polyfunctional nitrile N-oxide or imine is used in combination with a latent base or other material that will function to produce the nitrile N-oxide or imine at the desired specific time, i.e., when the sealing or coating composition is applied.

Now in accordance with this invention it has been found that compositions can be prepared which, when heated, will cross-link to solid, insoluble products. Since the composition can be prepared without using any solvents, there is little or no shrinkage upon curing. Typical compositions of this invention contain an unsaturated polymer, a precursor of a polyfunctional nitrile N-oxide or nitrile imine compound and the adduct of a tertiary amine with a sultone containing two or three carbon atoms in the sultone ring.

Any unsaturated polymer, containing ethylenic unsaturation, where there is at least one hydrogen radical attached to at least one of the carbon atoms of the ethylenic double bond, can be used in the compositions of this invention. Where fluid compositions are desired, unsaturated polymers having a molecular weight range of from about 1,000 to about 20,000 are preferred. However, higher molecular weight polymers can be used in conjunction with small amounts of solvents and/or plasticizers to obtain the desired fluidity. Typical unsaturated polymers that can be used are polybutadiene-1,2, polybutadiene-1,4, styrene-butadiene copolymers, isobutylene-isoprene copolymers, natural rubber, polyester resins, such as maleate- and fumarate-containing polyesters and unsaturated acrylate copolyesters, butadiene-acrylonitrile copolymers, ethylene-propylene-dicyclopentadiene terpolymers, polychloroprene, polyisoprene, unsaturated polyurethanes, unsaturated alkyd resins such as tall oil alkyd resins, polyether copolymers and terpolymers containing at least two unsaturated epoxide constituents such as propylene oxide-allyl glycidyl ether copolymers and ethylene oxide-epichlorohydrin-allyl glycidyl ether ter-polymers, etc., and blends of these polymers with each other. In addition to the olefinically unsaturated polymers, polymers containing acetylenic unsaturation can be used. In some cases it may be desirable to use partially hydrogenated products of the above unsaturated polymers.

Any precursor of a polyfunctional nitrile N-oxide or nitrile imine compound having the formula selected from the group consisting of

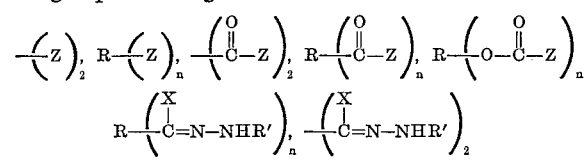

and

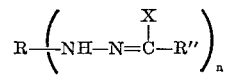

where

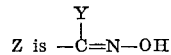

Y is —NO$_2$ or a halide radical, i.e., fluorine, chlorine, bromine or iodine, R is an organic radical having a valence greater than 1, generally 2–10, R' is selected from the group consisting of the hydrogen and monovalent hydrocarbon radicals, R" is a monovalent hydrocarbon radical, X is a halide radical and $n$ is an integer equal to the valence of R.

Generally, R will be selected from the group consisting of the hydrocarbon, halide substituted hydrocarbon, hydrocarbon-oxy-hydrocarbon, hydrocarbon-thio-hydrocarbon and hydrocarbon-sulfonyl-hydrocarbon polyvalent radicals. In preferred embodiments of this invention R is a divalent hydrocarbon radical selected from the group consisting of alkylene radicals such as, for example, ethylene, trimethylene, tetramethylene, pentamethylene, hexamethylene, octamethylene, decamethylene, dodecamethylene, octadecamethylene, and the like; arylene radicals such as o-, m-, p-phenylene, halogenated o-, m-, p-phenylene, biphenylene, naphthylene, and the like; cycloalkylene radicals such as cyclohexylene, cyclopentylene, cyclooctylene, cyclobutylene, and the like; arylene-dialkylene radicals such as o-, m-, p-xylene, o-, m-, p-phenylene diethylene and the like; alkylene-diarylene radicals such as methylene bis(o-, m-, p-phenylene), ethylene bis(o-, m, p-phenylene), and the like; cycloalkylene-dialkylene radicals such as 1,2-, 1,3- and 1,4-cyclohexane dimethylene, 1,2- and 1,3-cyclopentane dimethylene and the like; alkylene oxy alkylene radicals such as ethylene oxy ethylene, and the like; arylene oxy arylene radicals such as phenylene oxy phenylene, and the like; alkarylene oxy alkarylene radicals such as methylene phenylene oxy methylene phenylene, and the like, and the corresponding thio and sulfonyl radicals such as ethylene thio ethylene, phenylene thio phenylene, phenylene methylene thio methylene phenylene, and butylene sulfonyl butylene, and the like.

Generally, the monovalent hydrocarbon radicals in the group from which R' and R" are selected encompass alkyl radicals preferably containing 1–20 carbon atoms such as, for example, methyl, butyl, nonyl, decyl, pentadecyl, and the like; cycloalkyl radicals such as cyclopentyl, cyclohexyl, cyclooctyl, cyclododecyl, and the like; aryl radicals preferably having 1–3 rings such as phenyl, biphenyl, naphthyl, and the like; alkaryl radicals preferably having 1 or more alkyl groups containing 1–20 carbon atoms and 1–3 rings in the aryl group such as, for example, tolyl, octadecylnaphthyl, and the like; and similar aralkyl radicals, such as benzyl, naphthylhexamethylene, and the like.

Exemplary of the precursors of polyfunctional nitrile N-oxides and nitrile imines used in this invention are the polyfunctional hydraxide halides such as, for instance, isophthaloyl-bis(phenylhydrazide chloride),
terephthaloyl-bis(phenylhydrazide chloride),
isophthaloyl-bis(methylhydrazide chloride),
isophthaloyl-bis(ethylhydrazide fluoride),
terephthaloyl-bis(methylhydrazide chloride),
terephthaloyl-bis(ethylhydrazide bromide),
succinoyl-bis(phenylhydrazide chloride),
adipoyl-bis(methylhydrazide chloride),
p-phenylene dipropionyl-bis(methylhydrazide chloride),
tetramethylene dibenzoyl-bis(butylhydrazide iodide),
N,N'-p-phenylene-bis(benzoyl hydrazide chloride),
N,N'-m-phenylene-bis(benzoyl hydrazide chloride),
glutaryl-bis(phenylhydrazide chloride),
1,4-cyclohexanedicarbonyl-bis(phenylhydrazide chloride),
trimesoyl-tris(phenylhydrazide chloride),
trimesoyl-tris(methylhydrazide chloride),
trimesoyl-tris(ethylhydrazide chloride),
trimellitoyl-tris(phenylhydrazide chloride),
trimellitoyl-tris(methylhydrazide chloride),
pyromellitoyl-tetrakis(butylhydrazide chloride),
benzene pentacarbonyl-pentakis(phenylhydrazide chloride), and the like; the poly(hydroximoyl halides), polyfunctional carbonylhydroximoyl halides, and polyfunctional nitrolic acids such as 2,3-dioxosuccino-bis(hydroximoyl chloride),
methylene-bis(glyoxylohydroximoyl chloride),
ethylene-bis(glyoxylohydroximoyl chloride),
tetramethylene-bis(glyoxylohydroximoyl fluoride),
pentamethylene-bis(glyoxylohydroximoyl chloride),
1,2,3-propane-tris(glyoxylohydroximoyl chloride),
1,2,4-pentane-tris(glyoxylohydroximoyl chloride),
1,4-cyclohexane-bis(glyoxylohydroximoyl chloride),
p-phenylene-bis(acetohydroximoyl chloride),
2,2'-thia-bis(acetohydroximoyl chloride),
3,3'-thia-bis(propionohydroximoyl chloride),
isophthalo-bis(hydroximoyl chloride),
terephthalo-bis(hydroximoyl chloride),
4,4'-bis(benzohydroximoyl chloride),
4,4'-methylene-bis(benzohydroximoyl chloride),
4,4'-oxa-bis(benzohydroximoyl chloride),
3,3'-thia-bis(benzohydroximoyl chloride),
p-phenylene-bis(glyoxylohydroximoyl chloride),
4,4'-bis(phenylglyoxylohydroximoyl chloride),
4,4'-methylene-bis(phenylglyoxylohydroximoyl chloride), the ethylene glycol, tetramethylene glycol, 1,4-cyclohexylene glycol, resorcinol, etc., esters of chloroximinoglyoxylic acid, etc., 4,4'-methylene-bis(phenylglyoxylonitrolic acid), m-phenylene-bis(glyoxylonitrolic acid), 4,4'-bis(phenylglyoxylonitrolic acid), etc.

The above-described precursors are converted to nitrile N-oxides or nitrile imines by the action of the sultone adduct of the tertiary amine. It is believed that these sultone adducts act by abstracting hydrogen halide from the precursor converting it to either a nitrile N-oxide or nitrile imines. The resulting nitrile N-oxide or nitrile imine in turn is believed to react with the double bonds of the polymer by way of 1,3-dipolar addition.

The sultone adducts that are useful, in accordance with this invention, are adducts of sultones containing two or three carbon atoms in the sultone ring with mono- or poly-tertiary amines. These adducts are prepared by reacting the sultone with the tertiary amine. Exemplary of the sultones that can be used are propane sultone, 3-methyl-1,3-propane sultone, 1-phenyl-1,2-ethane sultone, 1,2-diphenyl-1,2-ethane sultone, 1-phenyl - 1,3 - propane sultone, 2-phenyl-1,3-propane sultone, 3-phenyl-1,3-propane sultone, 1-cyclohexyl-1,3-propane sultone, 2-cyclohexyl-1,3-propane sultone, 3-cyclohexyl-1,3-propane sultone, etc. Exemplary of the tertiary amines that can be used are trialkylamines where the alkyl group contains 1 to 6 carbon atoms such as triethylamine, tributylamine, triamylamine, etc., cyclohexyldimethylamine, cyclohexyldiethylamine, dimethylaniline, cyclic tertiary amines including bicyclic amines such as the aza-bicyclo[2·2·2]octanes, as for example 1-azabicyclo[2·2·2]octane, also known as quinuclidine,
1-aza-3-hydroxybicyclo[2·2·2]octane, also known as 3-quinuclidinol,
1-aza-3-methoxybicyclo[2·2·2]octane,
1-aza-3-ethoxybicyclo[2·2·2]octane,
1-aza-3-phenoxybicyclo[2·2·2]octane,
1-aza-3-acetoxybicyclo[2·2·2]octane,
1-aza-3-benzoyloxybicyclo[2·2·2]octane,
1-aza-3-ketobicyclo[2·2·2]octane, also known as 3-quinuclidinone,
2-methyl-1-azabicyclo[2·2·2]octane,
2-ethyl-1-azabicyclo[2·2·2]octane,
3-methyl-1-azabicyclo[2·2·2]octane,
3-ethyl-1-azabicyclo[2·2·2]octane,
4-methyl-1-azabicyclo[2·2·2]octane,
2,6-dimethyl-1-azabicyclo[2·2·2]octane,
3,5-dimethyl-1-azabicyclo[2·2·2]octane,
2,2,6-trimethyl-1-azabicyclo[2·2·2]octane,
3-ethyl-3-methyl-1-azabicyclo[2·2·2]octane,
1,4-diazabicyclo[2·2·2]octane, also known as triethylenediamine,
2-methyl-1,4-diazabicyclo[2·2·2]octane,
2-ethyl-1,4-diazabicyclo[2·2·2]octane,
2,3-dimethyl-1,4-diazabicyclo[2·2·2]octane,
2,5-dimethyl-1,4-diazabicyclo[2·2·2]octane,
2,6-dimethyl-1,4-diazabicyclo[2·2·2]octane,
2,5,7-trimethyl-1,4-diazabicyclo[2·2·2]octane,
2,2,5,5-tetramethyl-1,4-diazabicyclo[2·2·2]octane, and the N-alkyl monocyclic amines, where the alkyl group contains from 1 to 6 carbon atoms, as for example N-methyl-morpholine,
N-ethyl-morpholine,
N-isopropyl-morpholine,
N-butyl-morpholine,
N-methyl-piperidine,
N-propyl-piperidine,
N-hexyl-piperidine,
N,N-dimethyl-piperazine,
N,N-diethyl-piperazine,
N,N-butyl-piperazine, etc.

The reaction can be carried out in any inert diluent, preferably one that is a solvent for the two reactants, and a non-solvent for the adduct that is produced. Exemplary of the diluents that can be used are hydrocarbons including aliphatic, cycloaliphatic and aromatic hydrocarbons such as pentane, hexane, octane, decane, benzene, toluene, xylene, and mixtures of these hydrocarbons as, for example, the petroleum hydrocarbon fractions, alcohols such as methanol, ethanol, etc., ethers such as diethyl ether, tetrahydrofuran, etc., esters such as ethyl acetate, ketones such as acetone, methyl ethyl ketone, methyl isobutyl ketone, etc., and other diluents such as dimethylsulfoxide, acetonitrile and dimethyl formamide. The reaction is generally carried out at room temperature and atmospheric pressure, but a temperature from about $-15°$ C. to about $100°$ C. can be used.

When a monoamine is used, there will be formed a 1:1 adduct with the sultone. However, when a diamine is used, either a 1:1 or 1:2 adduct, or a mixture thereof, can be produced, depending on the ratio of the reactants. Thus, for the production of a 1:1 adduct of the diamine, there will preferably be used less than a mole to mole ratio of the sultone to the diamine to insure production of the 1:1 adduct. Otherwise, there will generally be used an excess of the sultone.

Varied amounts of the three basic ingredients can be employed in preparing the cross-linkable compositions of this invention, depending upon the degree of cross-linking desired, the nature of the unsaturated polymer, etc. In general the amount of nitrile N-oxide or nitrile imine precursor employed (based on the weight of the polymer) will be from about 0.1% to about 30%, preferably from about 1% to about 10%. The sultone adduct of the tertiary amine will be present in amounts sufficient to convert the precursor to the corresponding nitrile N-oxide or nitrile imine, preferably in an excess of from about 1% to about 30% over that required to convert the precursor.

The cross-linkable compositions of this invention can be prepared by blending or admixing the ingredients in any desired fashion. For example, the unsaturated polymer and precursor can be dissolved in an anhydrous volatile solvent therefor and then admixed with the sultone adduct plus any other materials. After mixing, the solvent can be removed under reduced pressure.

It may be desirable in certain cases to modify the compositions by partially reacting the precursor with the polymer. For example, a bis(carbohydroximoyl chloride) can be treated with sufficient of the sultone adduct to only convert approximately half of the hydroximoyl chloride groups to nitrile N-oxide groups. When this treatment is conducted in the presence of the unsaturated polymer, the nitrile N-oxide groups will add onto the polymer at its double bonds, producing an unsaturated polymer substituted with carbohydroximoyl chloride substituents. Additional sultone adduct can be added to the carbohydroximoyl chloride substituted polymer. The resulting composition is stable until heated, at which time the hydroximoyl chloride groups convert to nitrile N-oxide groups which cross-link the polymer.

In addition to the three basic ingredients, other additives can be incorporated. Typical additives are fillers such as carbon black, titanium dioxide, silica, diatomaceous earth, talc, etc.; plasticizers such as phthalates, adipates, sebacates, fatty acid esters of pentaerythritol, fatty acid esters of dipentaerythritol, etc.; stabilizers; adhesive promoters, pigments; and so forth. Obviously there are many cases in which other additives are not required or desired, and excellent results are achieved when only the basic ingredients are employed.

As indicated above, cross-linking is initiated by heating the above-described composition. The specific conditions required for cross-linking depend upon the sultone adduct utilized. In general, the compositions will be cross-linked by heating at a temperature from about 90° C. to about 180° C. for a period of from about 0.5 minute to about 120 minutes. The compositions are relatively stable and can be stored at room temperature for months with little or no detectable cross-linking.

The compositions of this invention are useful in numerous applications. For example, they can be used as one component sealants such as caulking compositions which are fluid enough to extrude into a joint from a caulking gun but will not flow once placed in the joint and which cross-link on heating. Another use is as an adhesive. Compositions of this invention are excellent adhesives for bonding glass, metal, wood, plastics, fibers, fabrics, etc. Another use is in coating compositions. Still another use is in rubber casting or molding. Further uses will be apparent to those skilled in the arts.

The following examples will further illustrate the compositions of this invention. All parts and percentages are by weight unless noted otherwise.

EXAMPLE 1

Ten (10) parts of triethylenediamine were dissolved in 30 parts of anhydrous benzene. With stirring at room temperature a solution of 1.6 parts of 1,3-propane sultone in 250 parts of anhydrous benzene was added dropwise under a nitrogen blanket over 2 hours. The milky reaction mixture was stirred at room temperature for 12 hours. Then the solids were isolated by filtration under exclusion of moisture and dried under vacuum at room temperature. There was obtained 2.6 parts of a white, crystalline solid which was soluble in methanol and did not melt below 280° C. Elemental analysis showed it to be the monopropane sultone adduct of triethylenediamine (Found: 45.7% carbon, 7.8% hydrogen, 11.9% nitrogen and 13.9% sulfur; Calculated: 46.1, 7.68, 12.0 and 13.7%, respectively).

In a planetary mixer, 100 parts of an unsaturated alkyd resin (prepared from hexahydroterephthalic acid, diethylene glycol, dimerized tall oil, fatty acid and maleic anhydride; having a molecular weight of approximately 3100, an acid number of 67, hydroxyl number of 10, and bromine number of 35.2), 26 parts of bis(phenylhydrazide chloride), 30 parts of titanium dioxide as a filler, and 10 parts of chlorinated paraffin wax as a plasticizer were milled until homogeneous. Then 34 parts of the above-prepared mono-(1,3-propane sultone) adduct of triethylenediamine were added and the milling was continued until the mixture was homogeneous again.

The mixture was storable at room temperature under exclusion of moisture for 3 months without cross-linking.

A sample of the paste was heated to 120° C. for ½ hour. During this time, it cross-linked to a tough rubber which was insoluble in tetrahydrofuran.

EXAMPLE 2

Ten (10) parts triethylenediamine were dissolved in 100 parts of anhydrous methanol. The solution was stirred at room temperature under a nitrogen blanket and a solution of 30.0 parts of 1,3-propane sultone in 200 parts of anhydrous methanol was added dropwise. The reaction mixture was stirred at room temperature for 16 hours. Then the solids were isolated by filtration under a nitrogen blanket. After drying under vacuum at 60° C., 31.5 parts of solids were obtained, which did not melt or decompose up to 300° C. Analysis showed it to be the bis(propane sultone) adduct of triethylenediamine (Found: 45.7% carbon, 7.8% hydrogen, 11.9% nitrogen and 13.9% sulfur; Calculated: 46.1, 7.68, 12.0 and 13.7%, respectively).

One hundred (100) parts of an ethylenically triunsaturated, branched urethane copolymer having a molecular weight of approximately 5000, 12 parts of bis(phenylglyoxylohydroximoyl chloride), 20 parts of titanium dioxide as a filler and 5 parts of a chlorinated paraffin wax as a plasticizer were milled in a dough mixer until a homogeneous paste was obtained. Then 25 parts of the above-prepared bis(propane sultone) adduct of triethylenediamine were added and the milling was continued until the mixture was homogeneous again. The smooth paste was stored at room temperature under exclusion of moisture for 3 months without cross-linking.

A sample of the paste was heated to 120° C. for ½ hour. During this time, it cross-linked to a tough rubber which was insoluble in tetrahydrofuran.

EXAMPLE 3

Ten (10) parts of quinuclidine were dissolved in 300 parts of anhydrous tetrahydrofuran. This solution was stirred vigorously and externally ice cooled. Under a nitrogen blanket a solution of 12.0 parts of 1,3-propane sultone in 100.0 parts of anhydrous tetrahydrofuran, was added dropwise. After the addition was completed, the reaction mixture was allowed to warm to room temperature and was stirred for 4 hours. The solids were then isolated by filtration under anhydrous conditions, washed exhaustively with dry tetrahydrofuran and then dried under vacuum at 60° C. for 16 hours. There was obtained 19.1 parts of a white solid which did not melt below 280° C. Elemental analysis showed the product to be the 1,3-propane sultone adduct of quinuclidine (Found: 52.1% carbon, 7.99% hydrogen, 5.75% nitrogen and 14.1% sulfur; Calculated: 51.5, 8.15, 6.0 and 13.75% respectively).

In a dough mixer, 100 parts of polybutadiene (having a molecular weight of approximately 2000, an iodine number of 325 and a specific gravity of 0.91), 42 parts of isophthaloyl bis(phenylhydrazide chloride), 20 parts of titanium dioxide and 3 parts of hydrogenated castor oil as a thixotropic agent were milled until homogeneous. Then 5.5 parts of the above-prepared 1,3-propane sultone adduct of quinuclidine, finely ground, was added. The mixture was milled until homogeneous.

The cream which was obtained was stored at room temperature under exclusion of moisture for 3 months without cross-linking.

A sample of the above mixture was heated to 120° C. for ½ hour. During this time, it cross-linked to a tough rubber which was insoluble in tetrahydrofuran.

EXAMPLE 4

With external cooling, 9.0 parts of anhydrous dioxane was added to a solution of 8.0 parts of anhydrous sulfur trioxide in 375.0 parts of ethylene dichloride. With stirring, a solution of 10.4 parts of styrene in 33.0 parts of ethylene dichloride was added in one portion. The reaction mixture was stirred for 10 minutes at 0° C., and then 25.0 parts of 3-quinuclidinone dissolved in 25.0 parts of ethylene dichloride were added. The reaction mixture was allowed to sit at 0° C. for 2 days and then for 1 day at room temperature. The solids which had formed were isolated by filtration under anhydrous conditions, washed exhaustively with anhydrous ethylene dichloride and then dried under vacuum at room temperature for 24 hours. There was obtained 13.5 parts of a white solid which was shown by elemental analysis to be the 2-phenyl-1,2-ethane sultone adduct of 3-quinuclidinone (Found: 59.1% carbon, 5.8% hydrogen, 4.2% nitrogen and 10.2% sulfur; Calculated: 58.3, 6.15, 4.54 and 10.4%, respectively).

One hundred (100) parts of an ethylenically triunsaturated, branched urethane copolymer having a molecular weight of approximately 5000 were mixed with 12 parts of bis(phenylglyoxylohydroximoyl chloride), 20 parts of titanium dioxide as filler and 10 parts of chlorinated paraffin wax as a plasticizer and the mixture was milled in a dough mixer until homogeneous. Then 25.0 parts of the above-prepared 2-phenyl-1,2-ethane sultone adduct of 3-quinuclidinone were added. The milling was continued until the mass was homogeneous. A smooth paste was obtained which was storable at room temperature under exclusion of moisture for 3 months without a change in viscosity.

A sample of the paste was heated to 140° C. for 0.5 hour. During this time, it turned into a tough rubber which was insoluble in tetrahydrofuran.

EXAMPLE 5

Ten (10) parts of 3-quinuclidinone were dissolved in 300 parts of anhydrous tetrahydrofuran. This solution was cooled externally with ice and stirred under a nitrogen blanket. A solution of 15.0 parts 1,3-propane sultone in 150 parts anhydrous tetrahydrofuran was added dropwise. Then the reaction mixture was stirred at room temperature for 16 hours. The solids which formed were isolated by filtration under anhydrous conditions and washed exhaustively with anhydrous tetrahydrofuran. The solids were dried under vacuum at room temperature for 20 hours. There was obtained 19.5 parts of the 1,3-propane sultone adduct of 3-quinuclidinone. On analysis it was found to contain 47.8% carbon, 7.2% hydrogen, 5.5% nitrogen and 13.5% sulfur (theory is 48.5, 6.9, 5.7 and 13.0%, respectively).

One hundred (100) parts of an ethylenically triunsaturated, branched urethane copolymer having a molecular weight of approximately 5000 were mixed with 12.2 parts of 4,4'-oxa-bis-(phenylglyoxylohydroximoyl chloride), 15 parts of titanium dioxide as a filler, and 10 parts of chlorinated paraffin wax as a plasticizer and milled in a dough mixer until homogeneous. Then 18 parts of the above-prepared and finely ground, propane sultone adduct of 3-quinuclidinone were added. The milling was continued until the mixture was homogeneous again. A smooth paste was obtained, which could be stored at room temperature under exclusion of moisture for 3 months without cross-linking.

A sample of the paste was heated to 120° C. for 1 hour. During this time the paste cross-linked to a tough rubber which was insoluble in tetrahydrofuran.

EXAMPLE 6

Ten (10) parts of 3-quinuclidinol were dissolved in 300 parts of anhydrous tetrahydrofuran. The solution was stirred with external ice cooling. Under a nitrogen blanket a solution of 15.0 parts of 1,3-propane sultone in 100 parts of anhydrous tetrahydrofuran was added dropwise. After the addition was completed, the reaction mixture was allowed to warm up to room temperature and subsequently stirred at room temperature for 4 hours. Then the solids were isolated by filtration under anhydrous conditions and washed exhaustively with anhydrous tetrahydrofuran. The solids were dried at room temperature under vacuum for 16 hours. A yield of 18.7 parts of the propane sultone adduct of 3-quinuclidinol with a melting point above 300° C. was obtained. Analysis showed it to contain 47.7% carbon, 7.5% hydrogen, 5.3% nitrogen and 13.2% sulfur (theory is 47.1, 7.6, 5.6 and 12.9%, respectively).

One hundred (100) parts of a terpolymer of ethylene, propylene, and 1,4-hexadiene (containing 4 weight percent of units derived from propylene, and 58 weight percent of units derived from ethylene and containing about 6.2 double bonds per 1000 carbon atoms), 9.1 parts hexamethylene glycol ester of the oxime of chloroglyoxylic acid, 20 parts of titanium dioxide as filler, and 30 parts of chlorinated paraffin wax as plasticizer were mixed with 1000 parts of anhydrous tetrahydrofuran in a planetary mixer until homogeneous. Then the solvent was removed under reduced pressure. After adding 13.5 parts of the above-prepared propane sultone adduct of 3-quinuclidinol, the mixture was milled on a 3-roll mill until a homogeneous heavy paste was obtained.

This paste was stored at room temperature under exclusion of moisture for 6 months without cross-linking.

A sample of the paste was heated to 120° C. for ½ hour. During this time it cross-linked to a tough rubber which was insoluble in tetrahydrofuran.

EXAMPLE 7

A mixture of 24.4 parts of 1,3-propane sultone, 28.1 parts of triethylamine and 440 parts of benzene were heated at reflux temperature for 1.5 hours. The mixture was then cooled and filtered. The solid product was washed with methylene chloride and dried under vacuum. There was obtained 15.5 parts of a white solid having a melting point of 264–265° C. Elemental analysis showed it to be the propane sultone adduct of triethylamine (Found: 47.05% carbon, 9.77% hydrogen, 5.74% nitrogen and 13.8% sulfur; Calculated: 48.4, 6.28 and 14.4%, respectively).

In a dough mixer, 24 parts of a linear, ethylenically diunsaturated urethane copolymer having a molecular weight of approximately 15,000, 2.8 parts of a branched, ethylenically triunsaturated urethane copolymer having a molecular weight of about 5000, one part of bis(phenylglyoxylohydroximoyl chloride), 2.3 parts of thixotropic agent and 3 parts of an antioxidant were mixed under nitrogen with 1.753 parts of the above-prepared propane sultone adduct of triethylamine that had been finely ground. After mixing for 30 minutes, a smooth, tan paste was obtained.

A sample of this paste was heated to 130° C. for ½ hour. During this time it turned into a tough rubber, which was insoluble in tetrahydrofuran.

The cross-linkable paste was storable at room temperature under exclusion of moisture for weeks without a change in viscosity.

EXAMPLE 8

Ten (10) parts of N-methyl-morpholine were dissolved in 200 parts of anhydrous tetrahydrofuran and while stirring under a nitrogen blanket and with external ice cooling, a solution of 15 parts of 1,3-propane sultone in 100 parts of anhydrous tetrahydrofuran was added at such a rate that the temperature of the reaction mixture did not exceed 5° C. After the addition was completed, the reaction mixture was allowed to warm to room temperature and was kept at room temperature for 16 hours. The solid product was isolated by filtration under a nitrogen blanket, washed exhaustively with anhydrous tetrahydrofuran and then dried under vacuum at 60° C. for 16 hours. There was obtained 19.8 parts of a white solid which did not melt below 280° C. Elemental analysis showed it to be the propane sultone adduct of N-methyl-morpholine (Found: 43.7% carbon, 7.8% hydrogen, 5.9% nitrogen and 14.7% sulfur; Calculated: 43.0, 7.6, 6.3 and 14.4%, respectively).

One hundred (100) parts of an ethylenically triunsaturated, branched urethane copolymer having a molecular weight of approximately 5000, were mixed with 12 parts of bis(phenylglyoxylohydroximoyl chloride), 20 parts of titanium dioxide as filler, and 10 parts of chlorinated paraffin wax as a plasticizer and milled in a dough mixer until homogeneous. Then 25 parts of the above-prepared 1,3-propane sultone adduct of N-methyl-morpholine was added and the milling was continued until the mixture was again homogeneous. A smooth paste was obtained which was storable at room temperature in the absence of moisture for 3 months without a change in viscosity.

A sample of the paste was heated to 140° C. for 1 hour. During this time it cross-linked to a tough rubber, which was insoluble in tetrahydrofuran.

What I claim and desire to protect by Letters Patent is:

1. A cross-linkable polymer composition comprising (1) an ethylenically unsaturated polymer having at least one hydrogen radical attached to at least one of the carbon atoms of the ethylenic double bond, (2) the adduct of a tertiary amine and a sultone containing 2 or 3 carbon atoms in the sultone ring, and (3) a precursor of a polyfunctional nitrile N-oxide or nitrile imine having the formula selected from the group consisting of

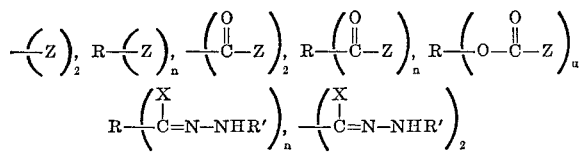

and

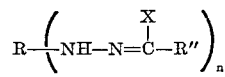

where

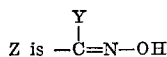

Y is —NO₂ or a halide radical, R is an organic radical having a valence of from 2 to 10, R' is selected from the group consisting of hydrogen and monovalent hydrocarbon radicals, R″ is a monovalent hydrocarbon radical, X is a halide radical and n is an integer equal to the valence of R.

2. The composition of claim 1 wherein the adduct is the 1,3-propane sultone adduct of a trialkylamine where the alkyl group contains 1 to 6 carbon atoms.

3. The composition of claim 1 wherein the adduct is the 1,3-propane sultone adduct of an N-alkyl monocyclic amine.

4. The composition of claim 1 wherein the adduct is the 1,3-propane sultone adduct of an aza-bicyclo [2·2·2] octane.

5. The composition of claim 2 wherein the trialkylamine is triethylamine.

6. The composition of claim 4 wherein the azabicyclo-[2·2·2]octane is quinuclidine.

7. The composition of claim 4 wherein the azabicyclo-[2·2·2]octane is triethylenediamine.

8. A process for cross-linking an ethylenically unsaturated polymer having at least one hydrogen radical attached to at least one of the carbon atoms of the ethylenic double bond, which comprises heating said polymer in admixture with an adduct of a tertiary amine and a sultone containing 2 or 3 carbon atoms in the sultone ring and a precursor of a polyfunctional nitrile N-oxide or nitrile imine having the formula selected from the group consisting of

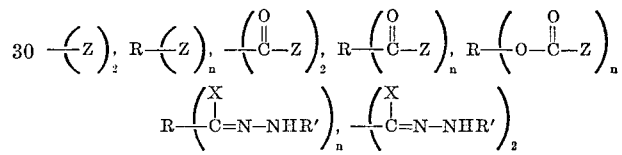

and

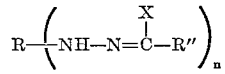

where Z is

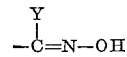

Y is —NO₂ or a halide radical, R is an organic radical having a valence of from 2 to 10, R' is selected from the group consisting of hydrogen and monovalent hydrocarbon radicals, R″ is a monovalent hydrocarbon radical, X is a halide radical and n is an integer equal to the valence of R.

9. The process of claim 8 wherein the sultone is 1,3-propane sultone.

References Cited
UNITED STATES PATENTS

| | | | |
|---|---|---|---|
| 3,454,506 | 7/1969 | Brack | 260—2.5 |
| 3,503,906 | 3/1970 | Brack | 260—2.5 |
| 3,576,908 | 4/1971 | Brack | 260—858 |
| 3,592,784 | 7/1971 | Brack | 260—2.5 |
| 3,627,715 | 12/1971 | Brack | 260—22 |

DONALD E. CZAJA, Primary Examiner

R. W. GRIFFIN, Assistant Examiner

U.S. Cl. X.R.

117—122 PA, 161 K, 161 R; 156—327, 338; 260—23.7 M, 28, 28.5 R, 40 R, 41 R, 41.5 R, 77.5 AC, 77.5 R. 80.78, 85.3

PO-1050
(5/69)

UNITED STATES PATENT OFFICE
CERTIFICATE OF CORRECTION

Patent No. __3,706,685__    Dated __12-19-72__

Inventor(s) __Karl Brack__

It is certified that error appears in the above-identified patent and that said Letters Patent are hereby corrected as shown below:

Col., 8, line 60 of Printed Patent; Page 16, line 24 of Specification - "9.4" was omitted and should read -- 9.4 -- following 48.4

Signed and sealed this 22nd day of May 1973.

(SEAL)
Attest:

EDWARD M.FLETCHER,JR.                      ROBERT GOTTSCHALK
Attesting Officer                              Commissioner of Patents